UNITED STATES PATENT OFFICE.

HERMAN FRASCH, OF CLEVELAND, OHIO, ASSIGNOR TO THE SOLAR REFINING COMPANY, OF OHIO.

DISTILLATION OF PETROLEUM.

SPECIFICATION forming part of Letters Patent No. 561,216, dated June 2, 1896.

Application filed July 14, 1890. Serial No. 358,713. (No specimens.)

*To all whom it may concern:*

Be it known that I, HERMAN FRASCH, of Cleveland, in the county of Cuyahoga and State of Ohio, have invented a new and useful Improvement in the Distillation of Petroleum, of which the following is a full, clear, and exact description.

In the distillation of petroleum for the manufacture of burning-oil as ordinarily practiced, after the removal of the lighter products, which are too light for burning-oil, a distillate is obtained which is of the highest grade and is known as "water-white." When the yield of water-white oil ceases, the further production of a distillate suitable for illuminating purposes is effected by an increase of heat and breaking up of the oil, known in the art as "cracking." The distillate thus produced, although of suitable gravity, is of darker color than the water-white oil, and is therefore of an inferior grade, known as "standard white;" but it is not only in the matter of color that this second run of burning-oil is inferior, as it has the peculiar property of binding chemically a considerable quantity of sulfur from the sulfuric acid employed in the after treatment of this distillate. In other words, the sulfuric acid combines with this distillate as a sulfo-hydrocarbon, which is insoluble in water and refuses to combine even with the strongest alkalies. The presence of this intractable sulfur compound injures the quality of the oil, inasmuch as when burned it is apt to smell more or less offensively and gives off injurious sulfurous fumes. If attempt be made to redistil these distillates, torrents of sulfur dioxid escape at the worm end, and the redistilled distillates are yellow, and on treatment with acid will take it up again, as did the original distillates. These results are due to the oxidation of hydrocarbons by the sulfuric acid, which is liberated by the heat and is reduced to sulfur dioxid by the said hydrocarbons. I have discovered that it is possible to redistil these cracked distillates after treatment with sulfuric acid without obtaining the deleterious reaction of the sulfuric acid and hydrocarbons upon each other. I have found that if an alkaline material, such as lime, be diffused through the oil from a time when the heat is yet approaching the boiling-point of water the liberated sulfuric acid will unite with said alkaline material in preference to the hydrocarbon. Precisely at what degree this liberation of sulfuric acid commences need not be defined, as the proper condition of the oil is easily secured by mixing the lime with the oil before distillation and keeping it mixed therewith. From the fact, however, that a diffusion of the alkaline material through the oil is essential while the temperature is still below the boiling-point of water it follows that a mere distillation over an alkali or alkaline solution with or without an injection of steam will not accomplish the result which I attain by the present invention. In accordance with said invention I take the cracked or second burning-oil distillate of a gravity of, say, 40° to 44° Baumé, and after treating it with sulfuric acid in an agitator and then washing it and neutralizing the acid in the usual way I mix with it dry hydrate of lime (in the proportion of about one pound of lime to each barrel of oil) and place the mixture in a still (or, if preferred, add the lime to the oil in the still) and distil off the oil, keeping the lime thoroughly mixed with the oil in the still by constant agitation. As the temperature rises a point is reached at which decomposition takes place of the compounds which resulted from the action of sulfuric acid on the cracked oil. This decomposition takes place, (at least to a material extent,) as already indicated, before the boiling-point of water is reached. Were it not for the lime the sulfuric acid would immediately oxidize the hydrocarbons, thereby forming sulfur dioxid and coloring the oil and producing bodies which in subsequent treatment with sulfuric acid would combine therewith. The lime being diffused through the oil at this time is exhibited to the sulfuric acid as it is liberated and under the then existing conditions has a stronger affinity than the hydrocarbons for the liberated acid. A precipitate of calcium sulfate is consequently formed and the deleterious action of the sulfuric acid upon the hydrocarbons is avoided. The distillate of this operation is freed from sulfur to a great extent, if not entirely, and no longer has the property of taking into combination a sufficient amount of sulfuric acid to impair its usefulness as burning-oil, so that it may now be subjected to sulfuric-acid treatment without injury. After this is done and the distillate is washed and treated with alkali to remove and neutralize the acid it is ready for the market. After the treatment above described this second grade of oil, being practically freed from sulfur and decolorized, is almost equal in all respects to the water-white distillate before referred to.

What I claim, therefore, as my invention, and desire to secure by Letters Patent, is—

1. The improvement in the distillation of petroleum, consisting in taking the distillate obtained by cracking heavier oils, and after the so-obtained distillate has been treated with sulfuric acid redistilling the same with diffusion of alkaline material such as lime through the said distillate, the diffusion of the said material being effected through the whole body of the oil while this is suitably below the boiling-point of water and continued through the subsequent rise of temperature to the boiling-point of oil and the consequent evaporation of the said oil, so that said material is exhibited to the compounds which resulted from the action of the sulfuric acid upon the cracked oil as the same are decomposing from the commencement throughout the progress of the decomposition, substantially as described.

2. The improvement in the distillation of petroleum, consisting in taking the distillate obtained by cracking heavier oils, and after the so-obtained distillate has been treated with sulfuric acid, redistilling the same with diffusion of alkaline material such as lime through the said distillate, the diffusion of the said material being effected through the whole body of the oil while this is suitably below the boiling-point of water and continued during the subsequent rise of temperature to the boiling-point of the oil and the consequent evaporation of the said oil, so that said material is exhibited to the compounds which resulted from the action of sulfuric acid upon the cracked oil as the same are decomposing from the commencement throughout the progress of the decomposition, and then subjecting the distillate of the redistilling operation to the sulfuric-acid treatment, substantially as described.

In testimony whereof I have hereunto set my hand this 14th day of June, A. D. 1890.

HERMAN FRASCH.

Witnesses:
F. W. LOTHMAN,
A. C. TILDEN.